(12) United States Patent
Kemmerling et al.

(10) Patent No.: US 10,436,147 B2
(45) Date of Patent: Oct. 8, 2019

(54) DIRECT-INJECTION INTERNAL COMBUSTION ENGINE WITH PISTON, AND METHOD FOR PRODUCING A PISTON OF AN INTERNAL COMBUSTION ENGINE OF SAID TYPE

(71) Applicant: Ford Global Technologies, LLC, Dearborn, MI (US)

(72) Inventors: Joerg Kemmerling, Monschau (DE); Leonhard Bartsch, Aachen (DE); Frank Wunderlich, Herzogenrath (DE); Heinz-Gerhard Wunderlich, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 281 days.

(21) Appl. No.: 15/290,933

(22) Filed: Oct. 11, 2016

(65) Prior Publication Data
US 2017/0107935 A1    Apr. 20, 2017

(30) Foreign Application Priority Data
Oct. 14, 2015  (DE) .................. 10 2015 219 895

(51) Int. Cl.
| | |
|---|---|
| *F02F 3/14* | (2006.01) |
| *F02M 29/00* | (2006.01) |
| *F02M 61/14* | (2006.01) |
| *F02F 3/28* | (2006.01) |
| *F02F 3/00* | (2006.01) |
| *F02B 23/06* | (2006.01) |
| *F02B 23/08* | (2006.01) |

(52) U.S. Cl.
CPC ............ *F02F 3/14* (2013.01); *F02B 23/0672* (2013.01); *F02B 23/08* (2013.01); *F02F 3/0076* (2013.01); *F02F 3/28* (2013.01); *F02M 29/00* (2013.01); *F02M 61/14* (2013.01); *F02F 2200/06* (2013.01); *Y02T 10/125* (2013.01)

(58) Field of Classification Search
CPC .............. F02B 23/0651; F02B 23/0672; F02B 23/0678–0693; F02F 3/0076; F02F 3/14; F02F 3/28; F02F 2200/06
USPC ......................................... 123/193.6
See application file for complete search history.

(56) References Cited

U.S. PATENT DOCUMENTS

| | | | | |
|---|---|---|---|---|
| 1,403,917 | A * | 1/1922 | Rowan ................. | F02F 3/0076 92/239 |
| 1,426,138 | A * | 8/1922 | Allyne ..................... | F02F 3/28 92/223 |
| 1,527,993 | A * | 3/1925 | Norton ..................... | F02F 3/28 92/239 |
| 1,708,428 | A * | 4/1929 | Moore .................... | F02B 23/08 123/265 |

(Continued)

FOREIGN PATENT DOCUMENTS

| | | | | |
|---|---|---|---|---|
| DE | 815580 | C * | 10/1951 | ............. F02B 19/14 |
| DE | 826994 | C * | 1/1952 | ................ F02F 3/28 |

(Continued)

*Primary Examiner* — John M Zaleskas
(74) *Attorney, Agent, or Firm* — Geoffrey Brumbaugh; McCoy Russell LLP

(57) ABSTRACT

Methods and systems are provided for a surface structure for a piston. In one example, the surface structure is located on at least a portion of the piston.

20 Claims, 4 Drawing Sheets

(56) References Cited

U.S. PATENT DOCUMENTS

| | | | | |
|---|---|---|---|---|
| 1,741,032 A * | 12/1929 | Minter | ............... | F02B 23/08 123/41.82 R |
| 2,100,143 A * | 11/1937 | Mock | ............... | F02B 1/00 123/260 |
| 2,178,993 A * | 11/1939 | Hill | ............... | F16J 9/20 184/18 |
| 2,269,084 A * | 1/1942 | McCarthy | ............... | F02B 23/00 123/298 |
| 2,420,474 A * | 5/1947 | Bradley | ............... | F02F 3/0076 123/193.6 |
| 2,573,536 A * | 10/1951 | Bodine, Jr. | ............... | F02B 23/08 123/188.2 |
| 2,662,517 A * | 12/1953 | Bodine, Jr. | ............... | F02B 23/08 123/193.4 |
| 2,762,348 A * | 9/1956 | Siegfried | ............... | F02B 23/0651 123/279 |
| 2,832,325 A * | 4/1958 | Julius | ............... | F02B 23/0603 123/276 |
| 2,942,591 A * | 6/1960 | Siegfried | ............... | F02B 3/00 123/263 |
| 3,025,839 A * | 3/1962 | Crowther | ............... | F02B 3/00 123/263 |
| 3,039,445 A * | 6/1962 | Crowther | ............... | F02B 23/0603 123/263 |
| 3,104,922 A * | 9/1963 | Baster | ............... | F02F 3/0076 123/193.6 |
| 3,209,735 A * | 10/1965 | Clarke | ............... | F02B 23/0651 123/193.6 |
| 3,240,193 A * | 3/1966 | Ephraim, Jr. | ............... | F02F 3/0076 123/41.35 |
| 3,456,638 A * | 7/1969 | Bodine | ............... | F02B 23/00 123/193.6 |
| 3,919,982 A * | 11/1975 | Goto | ............... | F02B 3/04 123/193.6 |
| 4,236,490 A * | 12/1980 | Correll | ............... | F02B 19/04 123/193.4 |
| 4,389,986 A * | 6/1983 | Tanasawa | ............... | F02B 1/08 123/298 |
| 4,471,734 A * | 9/1984 | Showalter | ............... | F02F 3/28 123/193.6 |
| 4,522,173 A * | 6/1985 | Agache | ............... | F02B 1/02 123/179.16 |
| 4,617,888 A * | 10/1986 | Dent | ............... | F02F 3/28 123/193.6 |
| 4,711,208 A * | 12/1987 | Sander | ............... | F02B 23/0603 123/271 |
| 5,857,440 A * | 1/1999 | O'Dowd | ............... | F02F 3/00 123/193.6 |
| 6,073,602 A | 6/2000 | Muta | | |
| 6,170,454 B1 * | 1/2001 | McFarland | ............... | F02F 3/28 123/193.6 |
| 6,237,579 B1 * | 5/2001 | Singh | ............... | F02B 19/12 123/193.5 |
| 6,336,437 B1 * | 1/2002 | Baika | ............... | F02B 23/104 123/298 |
| 6,684,844 B1 * | 2/2004 | Wang | ............... | F02F 1/20 123/193.1 |
| 7,810,479 B2 * | 10/2010 | Naquin | ............... | F02B 23/08 123/193.6 |
| 8,091,537 B2 * | 1/2012 | Manning | ............... | F02F 1/24 123/659 |
| 8,528,514 B1 * | 9/2013 | Erlandson | ............... | F02B 23/0627 123/193.4 |
| 8,677,974 B2 * | 3/2014 | Rothbauer | ............... | F02B 23/0636 123/298 |
| 8,757,129 B1 * | 6/2014 | Hill | ............... | F02B 31/04 123/297 |
| 9,476,381 B2 * | 10/2016 | Bowing | ............... | F02B 23/0621 |
| 2003/0089329 A1 * | 5/2003 | Flinchbaugh | ............... | F02F 3/28 123/193.6 |
| 2004/0261612 A1 * | 12/2004 | Gillman | ............... | F02F 3/0076 92/186 |
| 2007/0044755 A1 * | 3/2007 | Lehmann | ............... | F02F 3/10 123/307 |
| 2007/0113802 A1 * | 5/2007 | Mihara | ............... | F02F 3/12 123/41.35 |
| 2008/0135007 A1 * | 6/2008 | Storm | ............... | F02B 23/0654 123/143 C |
| 2010/0206263 A1 * | 8/2010 | Hasegawa | ............... | F02B 23/0651 123/279 |
| 2011/0073061 A1 * | 3/2011 | Chae | ............... | F02F 3/0076 123/193.6 |
| 2011/0139114 A1 * | 6/2011 | Nakazawa | ............... | F02F 3/027 123/193.6 |
| 2011/0253094 A1 * | 10/2011 | Rothbauer | ............... | F02B 23/0651 123/276 |
| 2011/0253095 A1 * | 10/2011 | Rothbauer | ............... | F02F 3/26 123/276 |
| 2011/0253096 A1 * | 10/2011 | Easley | ............... | F02B 23/0624 123/294 |
| 2011/0259297 A1 * | 10/2011 | Rothbauer | ............... | F02B 23/0651 123/276 |
| 2011/0265770 A1 * | 11/2011 | Malfa | ............... | F02B 23/08 123/559.1 |
| 2011/0315111 A1 | 12/2011 | Sasaki | | |
| 2013/0025561 A1 * | 1/2013 | Gabriel | ............... | C23C 4/04 123/193.6 |
| 2016/0102596 A1 * | 4/2016 | Vaden | ............... | F02B 23/0678 123/41.35 |

FOREIGN PATENT DOCUMENTS

| | | | | |
|---|---|---|---|---|
| DE | 1042947 B | | 11/1958 | |
| DE | 2729262 A1 | | 1/1979 | |
| DE | 3008330 A1 * | | 9/1981 | ............ F02F 3/0076 |
| DE | 19630502 A1 * | | 2/1998 | ............ F02B 3/06 |
| FR | 811000 A * | | 4/1937 | ............ F02F 3/28 |
| FR | 2114854 A5 * | | 6/1972 | ............ F02F 23/00 |
| FR | 2885650 A1 * | | 11/2006 | ............ F02B 23/063 |
| GB | 480149 A * | | 2/1938 | ............ F02F 3/28 |
| GB | 544300 | | 4/1942 | |
| GB | 2099919 A | | 12/1982 | |
| JP | 55131520 A * | | 10/1980 | ............ F02F 1/00 |
| JP | 61106951 A * | | 5/1986 | ............ F02F 3/003 |
| JP | 04031650 A * | | 2/1992 | ............ F02B 23/0651 |
| JP | 04339130 A * | | 11/1992 | ............ F02B 23/0627 |
| JP | 2000297694 A * | | 10/2000 | |
| WO | WO 2004059144 A1 * | | 7/2004 | ............ F02B 23/06 |
| WO | 2013098464 A1 | | 7/2013 | |
| WO | 2015051991 A1 | | 4/2015 | |

* cited by examiner

DIRECT-INJECTION INTERNAL COMBUSTION ENGINE WITH PISTON, AND METHOD FOR PRODUCING A PISTON OF AN INTERNAL COMBUSTION ENGINE OF SAID TYPE

CROSS REFERENCE TO RELATED APPLICATIONS

This application claims priority to German Patent Application No. 102015219895.2, filed Oct. 14, 2015, the entire contents of which are hereby incorporated by reference for all purposes.

FIELD

The present application relates to producing and installing a surface structure for a piston of an internal combustion engine.

BACKGROUND/SUMMARY

An internal combustion engine of the stated type is used as a motor vehicle drive unit. Within the context of the present disclosure, the expression "internal combustion engine" encompasses diesel engines and Otto-cycle engines and also hybrid internal combustion engines, which utilize a hybrid combustion process, and hybrid drives which comprise not only the internal combustion engine but also an electric machine which can be connected in terms of drive to the internal combustion engine and which receives power from the internal combustion engine or which, as a switchable auxiliary drive, additionally outputs power.

Internal combustion engines have a cylinder block and at least one cylinder head which are connected to one another to form the cylinders, that is to say the combustion chambers. The cylinder block, as the upper crankcase half, generally serves for the mounting of the crankshaft and for accommodating the piston and the cylinder liner of each cylinder. The cylinder head normally serves for accommodating the valve drives required for the charge exchange.

During the course of the charge exchange, the discharge of the combustion gases via the exhaust-gas discharge system takes place via the at least one outlet opening, and the feed of the combustion air via the intake system takes place via the at least one inlet opening of the cylinder. In the case of four-stroke engines, use is made almost exclusively of lifting valves for the control of the charge exchange. The actuating mechanism, including the associated valve, is referred to as valve drive.

The crankshaft which is mounted in the crankcase absorbs the connecting rod forces and transforms the oscillating stroke movement of the pistons into a rotational movement of the crankshaft. The upper crankcase half formed by the cylinder block is generally supplemented by the oil pan, which can be mounted on the cylinder block and which serves as the lower crankcase half. The oil pan serves to collect and store the engine oil and is commonly part of the oil circuit. To hold and mount the crankshaft, at least two bearings are provided in the crankcase.

In the development of internal combustion engines, it is constantly sought to minimize fuel consumption and reduce pollutant emissions.

Fuel consumption poses a problem in particular in the case of Otto-cycle engines, that is to say in the case of spark-ignition internal combustion engines. The reason for this lies in the principle of the operating process of the traditional Otto-cycle engine. The traditional Otto-cycle engine operates with external mixture formation and a homogeneous fuel-air mixture, in which the desired power is set by varying the charge of the combustion chamber, that is to say by means of quantity regulation. By adjusting a throttle flap which is provided in the intake system, the pressure of the inducted air downstream of the throttle flap can be reduced to a greater or lesser extent. For a constant combustion chamber volume, it is possible in this way for the air mass, that is to say the quantity, to be set by means of the pressure of the inducted air. This also explains why quantity regulation has proven to be disadvantageous specifically in part-load operation, because low loads demand a high degree of throttling and a pressure reduction in the intake system, as a result of which the charge exchange losses increase with decreasing load and increasing throttling.

One approach for dethrottling the Otto-cycle working process is to utilize direct fuel injection. The injection of fuel directly into the combustion chamber of the cylinder is considered to be a suitable measure for noticeably reducing fuel consumption even in Otto-cycle engines. The dethrottling of the internal combustion engine is realized by virtue of quality regulation being used within certain limits.

With the direct injection of the fuel into the combustion chamber, it is possible in particular to realize a stratified combustion chamber charge, which can contribute significantly to the dethrottling of the Otto-cycle working process because the internal combustion engine can be leaned to a great extent by means of the stratified charge operation, which offers thermodynamic advantages in particular in part-load operation, that is to say in the lower and middle load range, when only small amounts of fuel are to be injected. The stratified charge is characterized by a highly inhomogeneous combustion chamber charge, wherein an ignitable fuel-air mixture with relatively high fuel concentration is present in the region of the ignition device.

There is relatively little time available for the injection of the fuel, for the mixture preparation in the combustion chamber, specifically the mixing of air and fuel and the preparation of the fuel within the context of preliminary reactions including evaporation, and for the ignition of the prepared mixture.

The resulting demands placed on the mixture formation relate not only to the direct-injection Otto-cycle engine but basically to any direct-injection internal combustion engine, and thus also to direct-injection diesel engines. The internal combustion engine to which the present disclosure relates is very generally a direct-injection internal combustion engine.

Since, in the case of direct injection, there is only little time available for the mixture formation, there is a demand, inter alia, for a combustion chamber geometry by way of which the mixture formation is assisted and accelerated in order to substantially homogenize the fuel-air mixture before the ignition, at least as long as there is no demand for stratified-charge operation. The piston takes on a particular significance in this context, wherein the combustion chamber is formed jointly by the piston crown of said piston together with the cylinder liner and the cylinder head.

The mixture formation is substantially assisted and accelerated in that a forced charge movement in the combustion chamber, for example a tumble or a swirl, ensures good mixing of the intake air with the injected fuel. The fuel may also be injected into the combustion chamber in such a way that the injection jet is targeted toward a wall delimiting the combustion chamber, preferably into a depression provided on the piston crown. It is the intention for the fuel jet to be, as a result of the impingement, broken up into multiple jet parts and diverted such that as large an area of the combustion chamber as possible is encompassed by the fuel jets. The transportation and the distribution of the fuel are furthermore assisted by the impetus of the injection jet.

In direct-injection internal combustion engines which are operated with an excess of air, that is to say for example direct-injection diesel engines but also direct-injection Otto-cycle engines, the nitrogen oxides contained in the exhaust gas cannot be reduced out of principle, that is to say on account of the lack of reducing agents, for example, carbon monoxide or unburned hydrocarbons, in the exhaust gas. Furthermore, owing to the more or less inhomogeneous fuel-air mixture, soot emissions represent a problem.

For the reduction of the nitrogen oxide emissions of an internal combustion engine, a distinction can be made between two fundamentally different approaches.

In a first approach, it is sought to influence the combustion process such that the fewest possible nitrogen oxides arise, that is to say are formed, during the combustion of the fuel in the first place.

Since the formation of the nitrogen oxides requires not only an excess of air but also high temperatures, combustion processes with relatively low combustion temperatures, so-called LTC methods, are, inter alia, expedient for the reduction of the untreated emissions of nitrogen oxides.

Low combustion temperatures may be realized by virtue of the ignition retardation being increased, and the rate of combustion being reduced. Both can be achieved through the admixing of combustion gases to the cylinder fresh charge or by increasing the exhaust-gas fraction in the cylinder fresh charge, whereby exhaust-gas recirculation is to be regarded as a suitable measure for lowering the combustion temperature, specifically both external exhaust-gas recirculation, that is to say the recirculation of combustion gases from the exhaust-gas side to the intake side of the internal combustion engine, and internal exhaust-gas recirculation, that is to say the retention of exhaust gases in the cylinder during the charge exchange. With increasing exhaust-gas recirculation rate, the nitrogen oxide emissions can be considerably reduced.

To obtain an adequate or noticeable reduction in nitrogen oxide emissions, high exhaust-gas recirculation rates are required which may be of the order of magnitude of $x_{EGR} \approx 60\%$ to 70%. Therefore, the hot exhaust gas is preferably cooled during the course of the recirculation. The cooling of the recirculated exhaust gas facilitates, or permits, the realization of high recirculation rates. The lowering of the temperature of the exhaust gas during the course of the cooling leads to an increase in density, and to a smaller exhaust-gas volume for a given exhaust-gas mass. Furthermore, the cooling of the recirculated exhaust gas assists the lowering of the combustion temperature, because this also results in the temperature of the entire cylinder fresh charge being lowered.

Not only the untreated nitrogen oxide emissions but also the untreated soot emissions are reduced as a result of the measures described above.

Even though the low-temperature method, that is to say the LTC method, yields considerable improvements with regard to pollutant emissions, said approach is subject to limits. Specifically, at high loads, it is generally not possible to realize high recirculation rates, wherein it is specifically at high loads that the highest process temperatures arise, which would have to be lowered in order to reduce the untreated nitrogen oxide emissions.

The second approach for reducing the nitrogen oxide emissions comprises in aftertreatment of the exhaust gas that is formed during the combustion, and of the pollutants contained therein. To reduce pollutant emissions, internal combustion engines may be equipped with various exhaust-gas aftertreatment systems.

The use of exhaust-gas aftertreatment systems is likewise associated with disadvantages. Firstly, the aftertreatment of exhaust gases is expensive, in particular owing to the required coating of the catalytic converters with high-grade metals. Secondly, it may be taken into consideration that different aftertreatment systems are used for the various pollutants, that is to say a multiplicity of systems is required, and the systems have a limited service life and may even have to be replaced prematurely in the event of damage. The installation of the exhaust-gas aftertreatment systems may also lead to packaging problems.

Furthermore, the operation of the exhaust-gas aftertreatment systems is associated with disadvantages, for example the use of fuel for regenerating or maintaining the functionality of the exhaust-gas aftertreatment systems, and associated oil thinning. The exhaust-gas aftertreatment may furthermore limit the operation of the internal combustion engine.

The above statements make it clear that it is basically advantageous to keep the untreated emissions as low as possible in order to thereby minimize the outlay in the context of an exhaust-gas aftertreatment system. In this respect, aside from the LTC method and aside from exhaust-gas recirculation, further measures are desired to reduce the untreated emissions of a direct-injection internal combustion engine.

Against the background of that stated above, it is an object of the present disclosure to provide a direct-injection internal combustion engine as per the preamble of claim 1, in the case of which the fuel-air mixture situated in the combustion chamber is homogenized more effectively before the ignition, and the untreated emissions are lower.

The inventors herein have recognized the above issues and identified an approach to at least partly address the issues. In one example approach, a direct-injection internal combustion engine having at least one cylinder head comprising at least one cylinder and having a crankshaft rotatably mounted in a crankcase, where each cylinder comprises a combustion chamber which is jointly formed by a piston crown of a piston associated with the cylinder, by a cylinder liner and by the at least one cylinder head, and which internal combustion engine is characterized in that the piston is equipped at least regionally with a surface structure, wherein more than 50% of the piston crown of the piston is equipped with a surface structure. In this way, the surface structure may beneficially alter combustion conditions.

The piston of the internal combustion engine according to the present disclosure has a structure at least regionally on its surface, that is to say on the outer side which delimits the piston at the outside. This has numerous positive effects.

Firstly, the structure increases the surface area of the piston and thus also the heat-transmitting surface area between the combustion chamber and the piston, or between the piston and the surroundings.

The heat released in the combustion chamber during the combustion by the exothermic, chemical conversion of the fuel is dissipated partially via those walls of the cylinder head, of the cylinder block and of the piston which delimit the combustion chamber and partially via the exhaust-gas flow. The equipping of the piston with a surface structure, and the associated increase in size of the heat-transmitting surface area, leads to an increase in the amount of heat that is dissipated from the combustion chamber via the piston, and thus to a lowering of the cylinder interior temperature and of the process temperatures. Here, both that side of the piston which faces toward the combustion chamber, and that side of the piston which faces toward the crankcase, that is to say the piston bottom side, are of relevance.

As already discussed in conjunction with the LTC method or the exhaust-gas recirculation, lower process temperatures lead to lower untreated nitrogen oxide and soot emissions.

The concept according to the present disclosure has advantages in particular at high loads, in the case of which it is generally not possible to realize high recirculation rates. This is because the enlarged heat-transmitting surface area of the piston is effective even at high loads, and ensures, together with the then high process temperatures, an increased dissipation of heat from the combustion chamber, that is to say a particularly pronounced lowering of the process temperature and thus reduction of the untreated emissions.

Secondly, the surface structure of the piston gives rise to additional micro-turbulence close to the surface of the piston, and thus a more intense charge movement in the combustion chamber. The surface structure assists and accelerates the mixture formation, that is to say the mixing of the air situated in the cylinder with the injected fuel. In particular, wetting of the piston crown with liquid fuel is counteracted, whereby the emissions of unburned hydrocarbons can be reduced.

The homogenization of the fuel-air mixture is promoted by the additional charge movement in the combustion chamber, whereby improved utilization of the energy bound in the fuel is also realized, that is to say an improvement in efficiency can be achieved.

With the internal combustion engine according to the present disclosure, the first object on which the present disclosure is based is achieved, that is to say an internal combustion engine is provided in the case of which the fuel-air mixture situated in the combustion chamber is homogenized more effectively before the ignition, and the untreated emissions are lower.

According to the present disclosure, more than 50% of the piston crown of the piston is equipped with a surface structure.

Embodiments of the internal combustion engine are also advantageous in which more than 70% of the piston crown of the piston is equipped with a surface structure.

Embodiments of the internal combustion engine are likewise advantageous in which more than 80% of the piston crown of the piston is equipped with a surface structure.

Embodiments of the internal combustion engine may also be advantageous in which the entire piston crown of the piston is equipped with a surface structure.

Embodiments of the internal combustion engine are advantageous in which the crankshaft is articulatedly connected to the piston of each cylinder such that, as the crankshaft rotates about an axis of rotation, the piston oscillates along a piston longitudinal axis, the piston longitudinal axis being perpendicular to the axis of rotation.

Embodiments of the internal combustion engine are advantageous in which each cylinder is equipped with an injection device which is arranged in the cylinder head, on the side facing the piston crown, for the purposes of directly injecting fuel into the combustion chamber of the cylinder.

Embodiments of the internal combustion engine are advantageous in which each cylinder has at least one inlet opening for the supply of the combustion air via an intake system and at least one outlet opening for the discharge of the combustion gases via an exhaust-gas discharge system.

It is the object of the valve drive to open and close the inlet and outlet openings of the cylinder at the correct times, with a fast opening of the greatest possible flow cross sections being sought in order to keep the throttling losses in the inflowing and outflowing gas flows low and in order to ensure increased charging of the combustion chamber with combustion air, and an effective discharge of the exhaust gases. Cylinders are therefore preferably equipped with two or more inlet openings and outlet openings respectively.

Embodiments of the internal combustion engine are advantageous in which the piston crown of each piston has a depression which comprises a depression base and walls which circumferentially laterally delimit the depression base.

The geometry of the piston crown, in particular a piston depression provided in the piston crown, has a significant influence on the charge movement and thus on the mixture formation in the combustion chamber. In the case of direct-injection internal combustion engines, use is generally made of depressions that are rotationally symmetrical with respect to the piston longitudinal axis, in particular omega-shaped depressions.

In this connection, embodiments of the internal combustion engine are advantageous in which the depression of the piston is equipped with a surface structure. This is advantageous in particular in embodiments in which the at least one injection jet is directed into the depression.

Embodiments of the internal combustion engine are advantageous in which the piston has multiple protruding elements for forming the surface structure.

In this context, embodiments of the internal combustion engine are advantageous in which the piston has multiple convex elements, that is to say outwardly domed elements, for forming the surface structure. Use may be made of spherical elements or conical or frustoconical elements. The cross section of the elements may be round, circular or elliptical, angular, polygonal or the like, and may also vary.

Here, embodiments of the internal combustion engine are advantageous in which the piston has multiple stud-like elements for forming a cauliflower-like surface structure. The elements may also transition into one another and form Siamese overlaps, that is to say may share regions of the piston.

In this connection, embodiments of the internal combustion engine are also advantageous in which the piston has multiple rib-like elements for forming the surface structure.

Embodiments of the internal combustion engine are also advantageous in which the piston has multiple recesses for forming the surface structure. The recesses are the counterpart, that is to say of the opposite design, to the protruding elements, specifically in the form of openings or hollows.

In this context, embodiments of the internal combustion engine are advantageous in which the piston has multiple concave recesses, that is to say inwardly domed recesses, for forming the surface structure.

The recesses, like the protruding elements, may also transition into one another and share regions of the piston. The recesses or elements provided for forming the surface structure may however also be arranged spaced apart from one another.

Embodiments of the internal combustion engine are advantageous in which the surface structure has a height of less than 5 millimeters, wherein the height refers to the spatial extent of the structure perpendicular to the surface of the piston.

Embodiments of the internal combustion engine are advantageous in which the surface structure has a height of less than 3 millimeters, wherein the height refers to the spatial extent of the structure perpendicular to the surface of the piston.

Embodiments of the internal combustion engine are advantageous in which the piston is, on a side facing toward the combustion chamber, equipped at least regionally with a surface structure.

In the present case, both effects imparted by the surface structure come to bear. Firstly, the heat-transmitting surface area between the combustion chamber and the piston is enlarged, and thus the heat transfer or the heat dissipation from the combustion chamber via the piston is increased. Secondly, the surface structure of the piston gives rise to an intensified charge movement in the combustion chamber.

Embodiments of the internal combustion engine are also advantageous in which the piston is, on a side facing toward the crankcase, equipped at least regionally with a surface structure. The enlargement of the heat-transmitting surface area on the underside of the piston increases the heat transfer between the piston and surroundings, in particular if an oil spray-type cooling arrangement is used to cool the underside of the piston.

Embodiments of the direct-injection internal combustion engine are advantageous in which a supercharging arrangement, preferably an exhaust-gas turbocharging arrangement, is provided.

Here, for supercharging, use is preferably made of at least one exhaust-gas turbocharger in which a compressor and a turbine are arranged on the same shaft, with the hot exhaust-gas flow being supplied to the turbine and expanding in said turbine with a release of energy, whereby the shaft is set in rotation. The energy supplied by the exhaust-gas flow to the turbine and ultimately to the shaft is used for driving the compressor which is likewise arranged on the shaft. The compressor conveys and compresses the charge air fed to it, as a result of which supercharging of the cylinders is obtained.

The advantages of the exhaust-gas turbocharger for example in relation to a mechanical charger are that no mechanical connection for transmitting power exists or is required between the charger and internal combustion engine. While a mechanical charger extracts the energy required for driving it entirely from the internal combustion engine, and thereby reduces the output power and consequently adversely affects the efficiency, the exhaust-gas turbocharger utilizes the exhaust-gas energy of the hot exhaust gases.

Nevertheless, embodiments of the internal combustion engine may also be advantageous in which the supercharging is realized by means of at least one mechanical charger, for example a compressor, if appropriate also in combination with an exhaust-gas turbocharging arrangement.

Supercharging serves primarily to increase the power of the internal combustion engine. Here, the air required for the combustion process is compressed, as a result of which a greater air mass can be supplied to each cylinder per working cycle. In this way, the fuel mass and therefore the mean pressure can be increased.

The greater amount of fuel injected per working cycle in the case of a supercharged internal combustion engine places particularly high demands on the mixture formation in order to ensure adequate mixing of the air situated in the cylinder with the injected fuel, that is to say in order to adequately homogenize the fuel-air mixture.

Supercharging is a suitable means for increasing the power of an internal combustion engine while maintaining an unchanged swept volume, or for reducing the swept volume while maintaining the same power. In any case, supercharging leads to an increase in volumetric power output and a more expedient power-to-weight ratio. If the swept volume is reduced, it is thus possible, given the same vehicle boundary conditions, to shift the load collective toward higher loads, at which the specific fuel consumption is lower. Supercharging of an internal combustion engine consequently assists in the efforts to minimize fuel consumption, that is to say to improve the efficiency of the internal combustion engine.

With targeted configuration of the supercharging, it is also possible to obtain advantages with regard to exhaust-gas emissions. With suitable supercharging for example of a diesel engine, the nitrogen oxide emissions can therefore be reduced without any losses in efficiency. The hydrocarbon emissions can be favorably influenced at the same time. The emissions of carbon dioxide, which correlate directly with fuel consumption, likewise decrease with falling fuel consumption.

The second sub-object on which the present disclosure is based, specifically that of specifying a method for producing a piston of a direct-injection internal combustion engine of a type described above, is achieved by way of a method which is distinguished by the fact that the piston is equipped at least regionally with a surface structure.

That which has already been stated with regard to the internal combustion engine according to the present disclosure also applies to the method according to the present disclosure.

Embodiments of the method are advantageous in which the piston is produced as a blank in a casting process, and finish machining of the blank is performed, during the course of which the surface structure is formed. The casting of the piston is particularly suitable for series production.

Here, embodiments of the method are shown in which the surface structure is formed by way of a coating process.

Embodiments of the method are also shown where the surface structure is formed together with the piston blank during the casting process.

BRIEF DESCRIPTION OF THE DRAWINGS

FIGS. 1-3 are shown approximately to scale.

DETAILED DESCRIPTION

Figure 1:
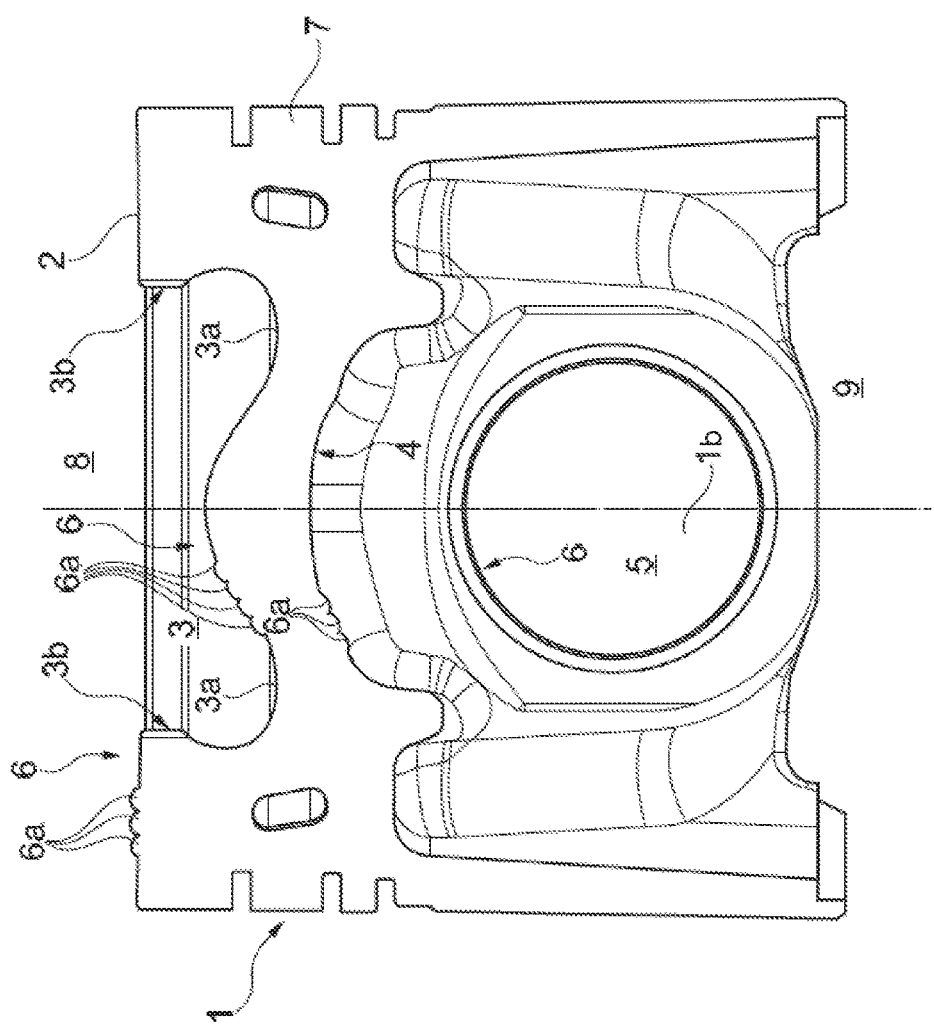
FIG. 1 schematically shows the piston of a cylinder of a first embodiment of the internal combustion engine for the purposes of illustrating the principle of the surface structure.

The following description relates to systems and methods for producing a surface structure for a piston. The surface structure may be located on both a combustion chamber side and a crankcase side of a piston, as shown in FIG. 1. The surface structure may comprise a plurality of designs, including but not limited to omega-shaped depressions, cauliflower-shaped projections, worm-like projections, rib-like etchings, and other suitable permutations. Various embodiments of the surface structure are shown in FIGS.

Figure 3:
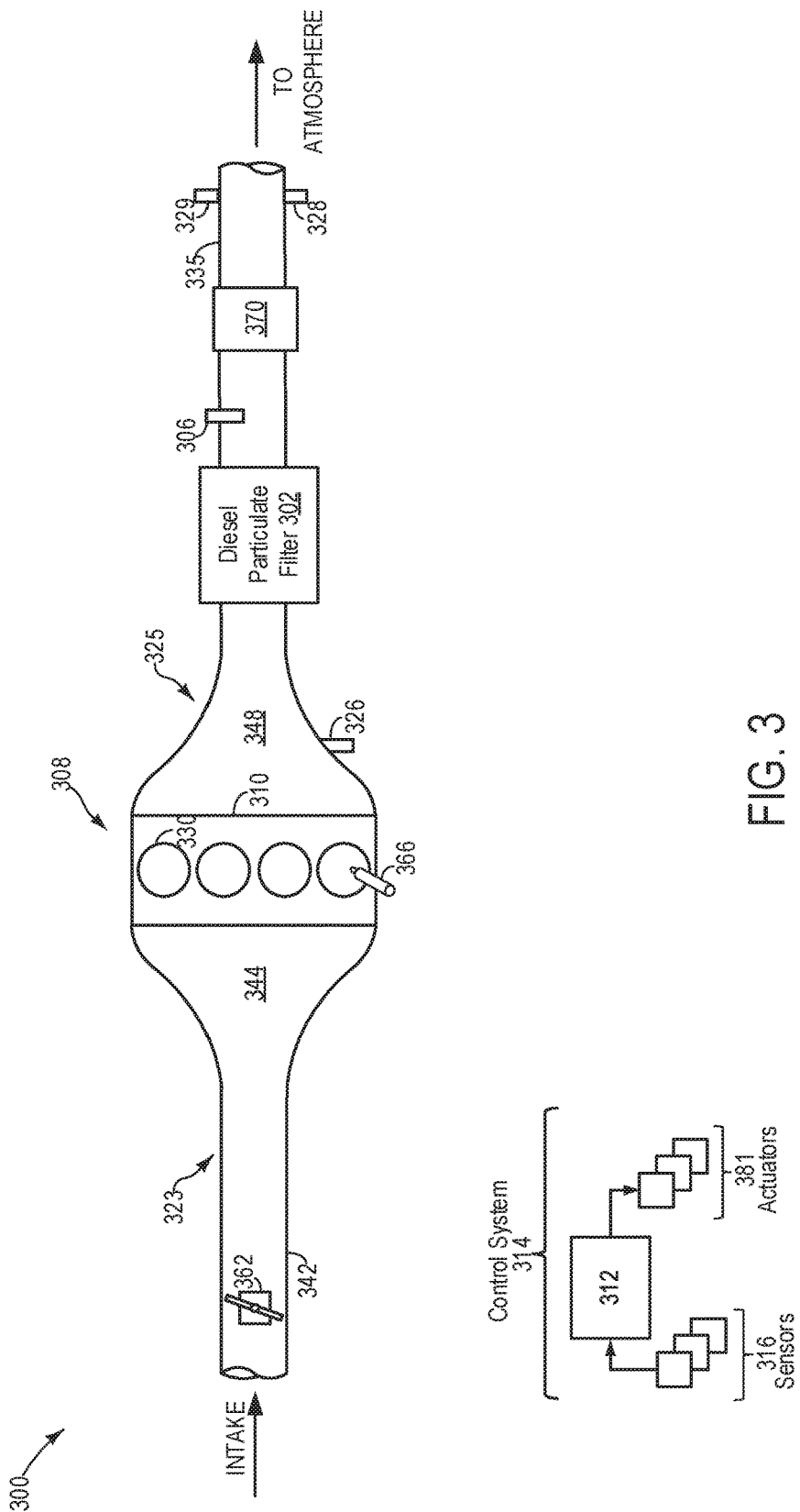
FIG. 3 shows a schematic of a vehicle system comprising an engine.
Figure 4:
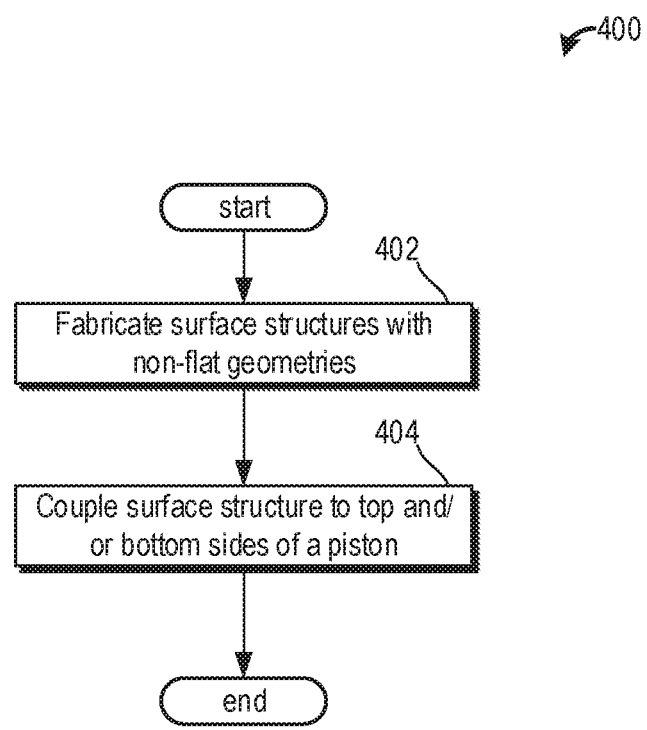
FIG. 4 shows a method for producing the surface structures.

2A, 2B, 2C, 2D, 2E, and 2F. A vehicle system comprising an engine is shown in FIG. 3. A method for producing the surface structure and coupling the surface structure to the piston is shown in FIG. 4.

Figure 2A:
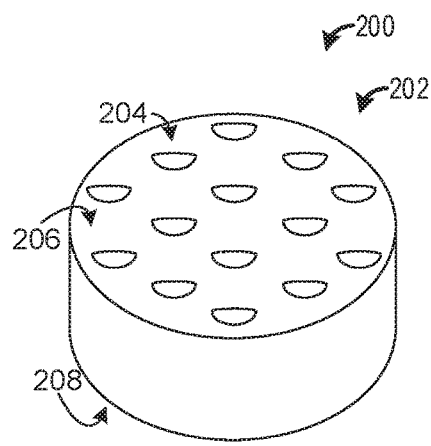
FIGS. 2A, 2B, 2C, 2D, 2E, and 2F show various embodiments of a surface structure.
Figure 2B:
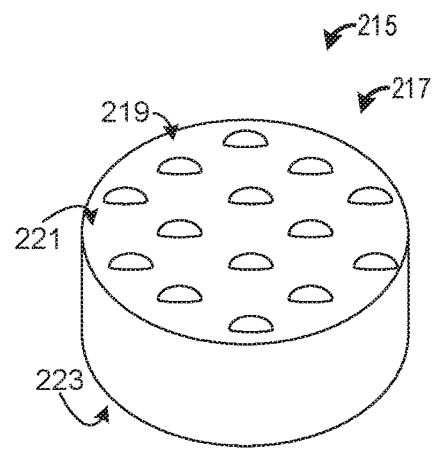
Figure 2C:
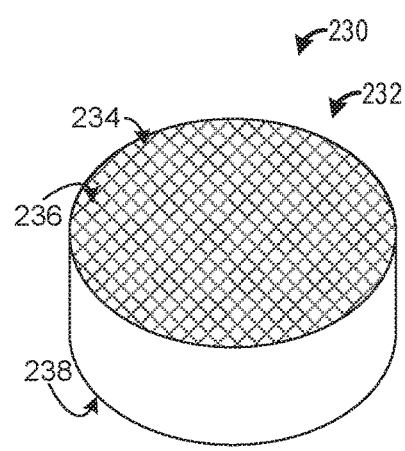
Figure 2D:
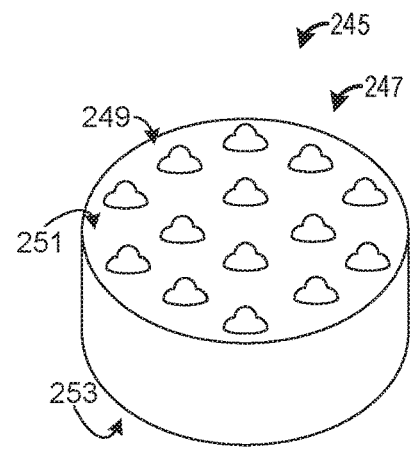
Figure 2E:
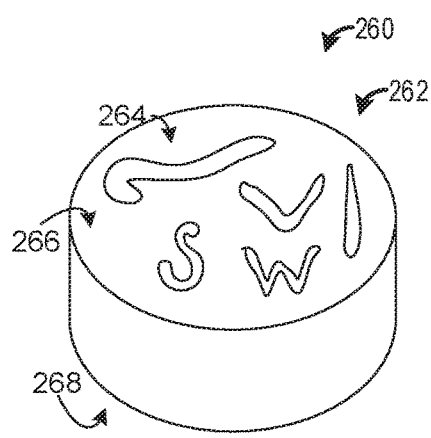
Figure 2F:
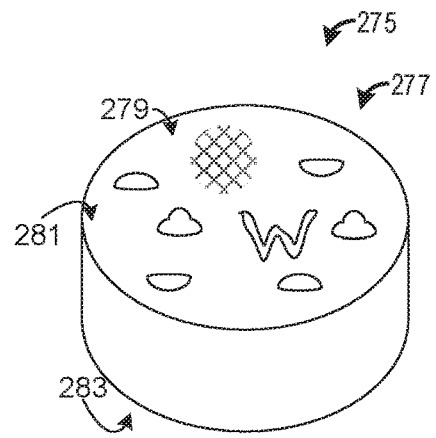

FIGS. 1-2F show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 1, it schematically shows the piston 1 of a cylinder of a first embodiment of the internal combustion engine, in a cross section through the piston longitudinal axis 1*b* and perpendicular to the crankshaft, for the purposes of illustrating the principle of the surface structure 6. The axis of rotation of the crankshaft is perpendicular to the plane of the drawing. A connecting rod which is mounted rotatably on the crankshaft is connected movably (not illustrated) to the piston 1 by way of a pin in the piston-pin bore 5.

The laterally arranged piston skirt 7 serves for the guidance of the piston 1 in the cylinder liner and for holding piston rings for sealing off the combustion chamber 8 with respect to the crankcase 9 and vice versa.

The piston crown 2 of the piston 1 has an omega-shaped piston depression 3, the depression base 3*a* of which is delimited circumferentially and laterally by walls 3*b*.

The piston 1 is, by way of example, equipped regionally with a surface structure 6, specifically both on the side facing toward the combustion chamber 8, that is to say on the piston crown 2, and on the side facing toward the crankcase 9, that is to say on the underside 4 of the piston 1.

Here, the piston 1 has, for forming a cauliflower-like surface structure 6, multiple protruding elements 6*a* which are of circular shape and outwardly domed.

By way of the surface structure 6, the heat-transmitting surface area between the combustion chamber 8 and the piston 1, and the heat-transmitting surface area on the underside 4 of the piston 1, are enlarged. The increased heat dissipation from the combustion chamber 8 via the piston 1 results in a lowering of the process temperatures and in reduced untreated emissions. Furthermore, the surface structure 6 of the piston crown 2 gives rise to an additional charge movement in the combustion chamber 8, and thus improved homogenization of the fuel-air mixture.

Turning now to FIGS. 2A, 2B, 2C, 2D, 2E, and 2F, they show various embodiments of a surface structure, which may used similarly to the surface structure 6 of FIG. 1. The embodiments may be optimized based on engine system geometry. Additionally or alternatively, a piston may be coupled to two different embodiments on opposite sides of the piston. As such, a combustion chamber side of the piston may be coupled to a first embodiment and a crankshaft side of the piston may be coupled to a second embodiment.

Each of the surface structures depicted in FIGS. 2A, 2B, 2C, 2D, 2E, and 2F comprise first and second surfaces. The second surface may be pressed against a piston surface while the first surface may be exposed to the combustion chamber or the crankshaft. As such, the etchings, depressions, protrusions, and/or other geometries introduced onto the surface structure are located on the first surface. The surface structure increases a surface area of the piston, which may provide increased mixing and/or turbulence when facing the combustion chamber while providing increased heat transfer when facing either the combustion chamber or the crankcase. By doing this, fuel efficiency may be increased, emissions may be decreased, combustion temperature control may be increased, and power output may increase.

The second side is pressed against a surface of a piston. As such, the second side and the surface of the piston may both be flat and sealingly coupled to one another via welds, screws, fusions, adhesives, and/or other coupling elements. In some examples, additionally or alternatively, the second side may comprise various coupling elements for interlocking with the piston. In one example, the second side and the piston comprise complementary notches and/or fixtures for sealingly coupling the surface structure to the piston when aligned.

The embodiments described below may depict examples of a surface structure manufactured separately from a piston. As such, each of the surface structures may comprise a circumference substantially similar to a circumference of the piston. Thus, depressions, protrusions, and striations shown on the piston may be readily adapted to be installed onto a piston surface.

Turning now to FIG. 2A, it shows an embodiment 200 of a surface structure 202 with depressions 204 located on a first surface 206 opposite a second side 208 of the surface structure 202. As shown, the depressions 204 are substantially identical to one another, with a depth and/or height of each of the depressions 204 being within a range of 3-5 mm. The depressions 204 are shown equally spaced about the first surface 206 of the surface structure 202 in a symmetric manner. It will be appreciated that the depressions 204 may be asymmetrically located on the first surface 206 without departing from the scope of the present disclosure. The depressions are omega-shaped in one example. However, it will be appreciated that the depressions may be other suitable shapes, such as semi-circular, oblong, etc.

As described above, depressions 204 may cover a 50% to nearly 100% of a surface of a piston. As such, a single large bowl shaped depression may be used in some embodiments.

Alternatively, a plurality of depressions are located on the piston with surface, a rim of each depression touching rims of adjacent depressions. Thus, the surface of the piston is undulating.

Turning now to FIG. 2B, it shows an embodiment 215 of a surface structure 217 having protrusions 219. The protrusions 219 are located evenly across the first surface 221, which is opposite the second side 223. The protrusions 219 are semi-circular, in one example. In other examples, the protrusions 219 may be dome-shaped, cone-shaped, cubical, frustoconical, and/or other shapes without departing from the scope of the present disclosure. In some examples, the protrusions 219 may be unevenly distributed along the first surface 221. For example, the protrusions 219 are more densely located along a center of the first surface 221.

Similarly to the depressions of FIG. 2A, adjacent protrusions may contact each other along respective rims such that a piston surface appears undulating. Alternatively, a single protrusion may cover the surface of the piston. Furthermore, the protrusions may be spaced apart from another such that they cover only a portion of the piston surface.

Turning now to FIG. 2C, it shows an embodiment 230 of a surface structure 232 having striations 234. The striations 234 are located along the first surface 236, which is opposite the second side 238. The striations 234 may be ridges and/or undulations, in one example. In other examples, the striations 234 may be circular, jagged, and/or other shapes without departing from the scope of the present disclosure. In some examples, the striations 234 may be unevenly distributed along the first surface 236. For example, the striations 234 are more densely located along a center of the first surface 236. As such, the striations 234 may not cover an entirety of the first surface 236, in alternative examples.

An entirety of a piston surface may include striations. Alternatively, groupings of striations may be spaced apart from each other across the piston surface such that only a portion of the piston surface is covered with striations.

Turning now to FIG. 2D, it shows an embodiment 245 of a surface structure 247 having cauliflower-shaped protrusions 249. The protrusions 249 are located along the first surface 251, which is opposite the second side 253. The protrusions 249 are bulbous, with various extensions extending therefrom. For example, the protrusions 249 may be substantially similar to the protrusions 219 of FIG. 2B, but may differ in that the protrusions 249 are less uniform and comprise uneven projections extending from a single protrusion. In some examples, the protrusions 249 may be unevenly distributed along the first surface 251. For example, the protrusions 249 are more densely located along a center of the first surface 251.

Turning now to FIG. 2E, it shows an embodiment 260 of a surface structure 262 having worm-like projections 264. The projections 264 are located unevenly across the first surface 266, which is opposite the second side 268. The projections 264 are oblong bubbles, in one example. In other examples, the projections 264 may be other shapes without departing from the scope of the present disclosure. As shown, each of the projections 264 is a different shape such that no two projections 264 are identical. In alternative examples, each of the projections 264 is substantially identical to one another. In some examples, the projections 264 may be evenly distributed along the first surface 266. Furthermore, the projections 264 are more densely located along a center of the first surface 266.

Turning now to FIG. 2F, it shows an embodiment 275 of a surface structure 277 having differently shaped protrusions and/or depressions 279. In one example, the embodiment 275 is a combination of the surface structures 202, 217, 232, 247, and 262. As such, the protrusions and/or depressions 279 may include cauliflower-shaped projections, omega-shaped depressions, dome-shaped projections, striations, and worm-like projections. The protrusions and/or depressions 279 are shown unevenly distributed along the first surface 281.

Turning now to FIG. 3, it shows an example cylinder 330 of an example vehicle system 300 configured to include the surface structure of FIGS. 1, 2A, 2B, 2C, 2D, 2E, and 2F. The vehicle system 300 includes an engine system 308. The engine system 308 may include an engine 310 having a plurality of cylinders 330. Engine 310 includes an engine intake 323 and an engine exhaust 325. Engine intake 323 includes a throttle 362 fluidly coupled to the engine intake manifold 344 via an intake passage 342. The engine exhaust 325 includes an exhaust manifold 348 eventually leading to an exhaust passage 335 that routes exhaust gas to the atmosphere. Throttle 362 may be located in intake passage 342 downstream of a boosting device, such as a turbocharger (not shown), and upstream of an after-cooler (not shown). When included, the after-cooler may be configured to reduce the temperature of intake air compressed by the boosting device.

Engine exhaust 325 may include one or more emission control devices 370, which may be mounted in a close-coupled position in the exhaust. One or more emission control devices may include a three-way catalyst, lean NOx filter, SCR catalyst, etc. Engine exhaust 325 may also include diesel particulate filter (DPF) 302, which temporarily filters PMs from entering gases, positioned upstream of emission control device 370. In one example, as depicted, DPF 302 is a diesel particulate matter retaining system. DPF 302 may have a monolith structure made of, for example, cordierite or silicon carbide, with a plurality of channels inside for filtering particulate matter from diesel exhaust gas. Tailpipe exhaust gas that has been filtered of PM, following passage through DPF 302, may be measured in a PM sensor 306 and further processed in emission control device 370 and expelled to the atmosphere via exhaust passage 335. In the depicted example, PM sensor 306 is a resistive sensor that estimates the filtering efficiency of the DPF 302 based on a change in conductivity measured across the electrodes of the PM sensor.

The vehicle system 300 may further include control system 314. Control system 314 is shown receiving information from a plurality of sensors 316 (various examples of which are described herein) and sending control signals to a plurality of actuators 381 (various examples of which are described herein). As one example, sensors 316 may include exhaust flow rate sensor 326 configured to measure a flow rate of exhaust gas through the exhaust passage 335, exhaust gas sensor (located in exhaust manifold 348), temperature sensor 328, pressure sensor 329 (located downstream of emission control device 370), and PM sensor 306. Other sensors such as additional pressure, temperature, air/fuel ratio, exhaust flow rate and composition sensors may be coupled to various locations in the vehicle system 300. As another example, the actuators may include fuel injectors 366, throttle 362, DPF valves that control filter regeneration (not shown), switch of electric circuit, etc. The control system 314 may include a controller 312. The controller 312 may be configured with computer readable instructions stored on non-transitory memory. The controller 312 receives signals from the various sensors of FIG. 3, processes the signals, and employs the various actuators of FIG.

3 to adjust engine operation based on the received signals and instructions stored on a memory of the controller.

Turning now to FIG. 4, it shows a method 400 for manufacturing and installing surface structures. The method 400 may be carried out by machinery in a factory based on instructions stored on a memory of a controller in conjunction with signals received from sensors of a factory system. For example, a camera may signal to a laser where to etch striations into a surface structure. As such, the method 400 described below may be used to describe a method for manufacture any of the surface structures described above.

At 402, the method 400 includes fabricating surface structures with non-flat geometries. This may include adding protrusions, depressions, striations, and/or the like to a single side of a surface structure. In one example, the surface structure is initially a cylinder with smooth top and bottom surfaces and a uniformly circular body. Following fabrication, a top or bottom surface of the cylinder is manipulated into having one or more disruptions causing the surface to no longer be smooth and/or level. As such, depressions may be pressed into a flat surface of the surface structure. Projections may be molded and/or welded onto the surface structure. Striations may be laser etched onto the surface structure. Thus, a flat surface may become uneven with an increased surface area.

At 404, the method 400 includes coupling the surface structure to a piston. The coupling may include screws, welds, fusions, and/or other suitable coupling elements. In some examples, the surface structure may be sprayed onto the piston. In one example, the surface structure may be 3-D printed onto the piston. The surface structure may be coupling to one or more of top and bottom surfaces of a piston, where the top surface is exposed to a combustion chamber and the bottom surface is exposed to a crankcase. The uneven surface of a first surface structure is exposed to the combustion chamber, in one example, to improve air/fuel mixing and decrease combustion temperatures by increasing heat transfer between the combustion gases and the surface structure and/or piston. Additionally, the uneven surface of a second surface structure is exposed to the crankcase to further decrease combustion temperatures by increasing heat transfer between cooling crankcase gases and the surface structure and/or piston.

In this way, an easy to design surface structure is coupled to a combustion chamber side of a piston to decrease combustion temperatures and increase air/fuel mixing. The surface structure comprises a variety of geometries deviating from a flat surface, which not only increase a surface area of the surface structure compared to the combustion chamber side of the piston, but also introduce micro-turbulances to increase mixing. The surface structure may also be located on a crankcase side of the piston to improve heat transfer between crankcase gases and the combustion chamber. The technical effect of positioning a surface structure on a piston is to decrease emissions, increase combustion temperature control, increase power output, and increase air/fuel in-cylinder mixing.

A direct-injection internal combustion engine comprising at least one cylinder head comprising at least one cylinder and having a crankshaft rotatably mounted in a crankcase, and where each cylinder comprises a combustion chamber jointly formed by a piston crown of a piston associated with the cylinder, by a cylinder liner, and by the at least one cylinder head, wherein the piston is equipped at least regionally with a surface structure, wherein more than 50% of the piston crown of the piston is equipped with the surface structure. A first example of the engine further comprising where the crankshaft is articulatedly connected to the piston of each cylinder such that, as the crankshaft rotates about an axis of rotation, the piston oscillates along a piston longitudinal axis, the piston longitudinal axis being perpendicular to the axis of rotation. A second example of the engine, optionally including the first example, further includes where each cylinder is equipped with an injection device arranged in the cylinder head, on the side facing the piston crown, and configured to directly inject fuel into the combustion chamber of the cylinder. A third example of the engine, optionally including the first and/or second examples, further includes where each cylinder has at least one inlet opening for the supply of the combustion air via an intake system and at least one outlet opening for the discharge of the combustion gases via an exhaust-gas discharge system. A fourth example of the engine, optionally including one or more of the first through third examples, further includes where the piston crown of each piston has a depression which comprises a depression base and walls which circumferentially laterally delimit the depression base. A fifth example of the engine, optionally including one or more of the first through fourth examples, further includes where the piston has multiple protruding elements for forming the surface structure. A sixth example of the engine, optionally including one or more of the first through fifth examples, further includes where the piston has multiple convex elements for forming the surface structure. A seventh example of the engine, optionally including one or more of the first through sixth examples, further includes where the piston has multiple stud-like elements for forming a cauliflower-like surface structure. An eighth example of the engine, optionally including one or more of the first through seventh examples, further includes where the piston has multiple rib-like elements for forming the surface structure. A ninth example of the engine, optionally including one or more of the first through eighth examples, further includes where the piston has multiple recesses for forming the surface structure. A tenth example of the engine, optionally including one or more of the first through ninth examples, further includes where the piston has multiple concave recesses for forming the surface structure. An eleventh example of the engine, optionally including one or more of the first through tenth examples, further includes where the surface structure has a height of less than 5 millimeters. A twelfth example of the engine, optionally including one or more of the first through eleventh examples, further includes where the surface structure has a height of less than 3 millimeters. A thirteenth example of the engine, optionally including one or more of the first through twelfth examples, further includes where the surface structure is located on at least a portion of a side of the piston facing toward the combustion chamber. A fourteenth example of the engine, optionally including one or more of the first through thirteenth examples, further includes where the surface structure is located on at least a portion of a side of the piston facing toward the crankcase.

A method comprising producing one or more surface structures along an assembly, where the surface structures comprise a first side configured to be coupled to a combustion chamber or crankshaft side of a piston, and a second side with one or more geometries configured to increase a surface area of the piston. A first example of the method further includes where the geometries include omega-shaped depressions, cone-shaped protrusions, cauliflower-shaped protrusions, and etchings. A second example of the method, optionally including the first example, further includes where the surface structure is formed by way of a coating process. A third example of the method, optionally including the first and/or second examples, further includes where the piston is produced as a blank in a casting process, and finish machining of the blank is performed, during the course of which the surface structure is formed.

A system comprising a piston comprising a first surface facing a combustion chamber and a second surface facing a crankcase and a surface structure physically coupled to the first and second surfaces, where the surface structure comprises cauliflower-shaped projections, omega-shaped depressions, worm-shaped projections, and etchings for increasing a surface area of the piston.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A direct-injection internal combustion engine comprising:
at least one cylinder head comprising at least one cylinder and having a crankshaft rotatably mounted in a crankcase, and where each cylinder comprises a combustion chamber jointly formed by a piston crown of a piston associated with the cylinder, by a cylinder liner, and by the at least one cylinder head,
wherein the piston is equipped at least regionally with a surface structure physically coupled to a first surface facing the combustion chamber and a second surface facing the crankcase, wherein more than 50% of each of the first surface and the second surface of the piston are equipped with the surface structure, and where the surface structure of the piston comprises bulbous projections, omega-shaped depressions, worm-shaped projections, and etchings for increasing a surface area of the piston, wherein the bulbous projections transition into one another and share regions of the first and second surfaces.

2. The direct-injection internal combustion engine as claimed in claim 1, wherein the crankshaft is articulatedly connected to the piston of each cylinder such that, as the crankshaft rotates about an axis of rotation, the piston oscillates along a piston longitudinal axis, the piston longitudinal axis being perpendicular to the axis of rotation.

3. The direct-injection internal combustion engine of claim 1, wherein each cylinder is equipped with an injection device arranged in the cylinder head, on a side facing the piston crown, and configured to directly inject fuel into the combustion chamber of the cylinder.

4. The direct-injection internal combustion engine of claim 1, wherein each cylinder has at least one inlet opening to supply combustion air via an intake system and at least one outlet opening to discharge combustion gases via an exhaust-gas discharge system.

5. The direct-injection internal combustion engine of claim 1, wherein the piston crown of each piston has a depression which comprises a depression base and walls which circumferentially laterally delimit the depression base.

6. The direct-injection internal combustion engine of claim 1, wherein the piston has multiple bulbous elements for forming a cauliflower-shaped surface structure, wherein the cauliflower-shaped surface structure comprises bulbous elements that transition and overlap into one another.

7. The direct-injection internal combustion engine of claim 1, wherein the piston has multiple striations for forming the surface structure.

8. The direct-injection internal combustion engine of claim 1, wherein the piston has multiple recesses for forming the surface structure.

9. The direct-injection internal combustion engine of claim 1, wherein the piston has multiple concave recesses for forming the surface structure.

10. The direct-injection internal combustion engine of claim 1, wherein the surface structure has a height of less than 5 millimeters.

11. The direct-injection internal combustion engine of claim 1, wherein the surface structure has a height of less than 3 millimeters.

12. A method comprising:
producing surface structures along an assembly of a piston, where the surface structures are configured to be fixed to a first surface arranged on a combustion chamber side of the piston and to a second surface arranged on a crankshaft side of the piston, wherein the surface structures comprise geometries configured to increase a surface area of the piston, wherein the geometries include omega-shaped depressions, cone-shaped protrusions, bulbous-shaped protrusions, worm-shaped projections, and etchings for increasing the surface area of the piston, and wherein the bulbous-shaped protrusions transition into one another and share regions of the first and second surfaces.

13. The method of claim 12, wherein the surface structures are formed by way of a coating process.

14. The method of claim 12, wherein the piston is produced as a blank in a casting process, and finish machining of the blank is performed, during the course of which the surface structures are formed.

15. A system comprising:
a piston comprising a first surface facing a combustion chamber and a second surface facing a crankcase; and
a surface structure physically coupled to the first and second surfaces; where
the surface structure comprises bulbous projections, omega-shaped depressions, worm-shaped projections, and etchings for increasing a surface area of the piston, wherein the bulbous projections transition into one another and share regions of the first and second surfaces.

16. The system of claim 15, wherein the piston comprises a piston crown at the first surface comprising a depression with a depression base and walls which circumferentially laterally delimit the depression base.

17. The system of claim 16, wherein the omega-shaped depressions are arranged in the depression base of the piston crown.

18. The system of claim 15, wherein the piston is arranged in a direct-injection engine, and where a crankshaft is articulatedly connected to the piston of each cylinder of the direct-injection engine such that, as the crankshaft rotates about an axis of rotation, the piston oscillates along a piston longitudinal axis, the piston longitudinal axis being perpendicular to the axis of rotation.

19. The system of claim 18, wherein each cylinder is equipped with an injection device arranged in a cylinder head, on a side facing the piston crown, and configured to directly inject fuel into the combustion chamber.

20. The system of claim 15, wherein the omega-shaped depressions are rotationally symmetrical with respect to a longitudinal axis of the piston.

* * * * *